United States Patent [19]
Sheng et al.

[11] Patent Number: 6,037,746
[45] Date of Patent: Mar. 14, 2000

[54] CHARGING DEVICE ON A VEHICLE TO CHARGE AN ELECTRIC BICYCLE

[75] Inventors: Wu Hung Sheng; Pao Pao Liu; Wu Meng Chi, all of Taichung, Taiwan

[73] Assignee: Taiwan Bicycle Industry R&D Center, Taichung, Taiwan

[21] Appl. No.: 09/285,837

[22] Filed: Apr. 2, 1999

[51] Int. Cl.[7] ............................ H02J 7/00; B02K 1/00; B62K 11/00
[52] U.S. Cl. ................... 320/104; 180/205; 180/65.2
[58] Field of Search .................................. 320/103, 104; 180/205, 65.2

[56] References Cited

U.S. PATENT DOCUMENTS

| | | | |
|---|---|---|---|
| 3,090,871 | 5/1963 | Gorman | 307/10.1 |
| 3,921,745 | 11/1975 | McCulloch et al. | 180/205 |
| 3,967,133 | 6/1976 | Bokern | 320/10.1 |
| 5,283,513 | 2/1994 | Fujita et al. | 320/138 |

*Primary Examiner*—Peter S. Wong
*Assistant Examiner*—Gregory J. Toatley, Jr.
*Attorney, Agent, or Firm*—Rosenberg, Klein & Lee

[57] ABSTRACT

A charging device for charging an electric bicycle includes a charger which is received in the trunk of a vehicle and electrically connected to the battery of the vehicle by a conductive wire. A wire extends from the charger and is detachably connected to the rechargeable battery of the electric bicycle which can be received in the trunk or carried on the vehicle by a bicycle carrier attached to the vehicle. The conductive wire has the first end connected to the charger and the second end having an adapter which is received in the cigarette lighter receptacle hole of the vehicle.

4 Claims, 3 Drawing Sheets

CHARGING DEVICE ON A VEHICLE TO CHARGE AN ELECTRIC BICYCLE

FIELD OF THE INVENTION

The present invention relates to a charging device, and more particularly, to a charging device positioned in the trunk of a vehicle and electrically connected between the battery of the vehicle and the rechargeable battery of an electric bicycle.

BACKGROUND OF THE INVENTION

An electric bicycle is a bicycle which has a rechargeable battery and driving means powered by the rechargeable battery so that the electric bicycle can be actuated by the electrical power. The rechargeable battery of the electric bicycle generally can supply power for about 30 minutes of operation of the bicycle so that a rider has to estimate his/her travel distance before he/she starts to take the bicycle trip. It is inconvenient for the rider to charge the rechargeable battery if the electric bicycle is used in a country area where the charging equipment is difficult to be found. Therefore, the rider has to charge the rechargeable battery of the electric bicycle at home before carrying the electric bicycle on his/her car to the country area where the electric bicycle is intended to be used.

The present invention provides a charging device on a vehicle which is electrically connected to the battery of the vehicle and to the rechargeable battery so that the rechargeable battery of the electric bicycle can be charged during the movement of the vehicle.

SUMMARY OF THE INVENTION

In accordance with one aspect of the present invention, there is provided a charging device on a vehicle for charging an electric bicycle. The charging device comprises a charger electrically connected to the battery of the vehicle by a conductive wire. At least one auxiliary wire extends from the charger to be electrically and detachably connected to the rechargeable battery of the electric bicycle which can be received in the trunk of the vehicle or carried on the vehicle. The conductive wire has the first end thereof connected to the charger and the second thereof having an adapter which is received in the cigarette lighter receptacle hole of the vehicle.

The primary object of the present invention is to provide a charging device on a vehicle, which charges the rechargeable battery of the electric bicycle whenever the engine of the vehicle is operated.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
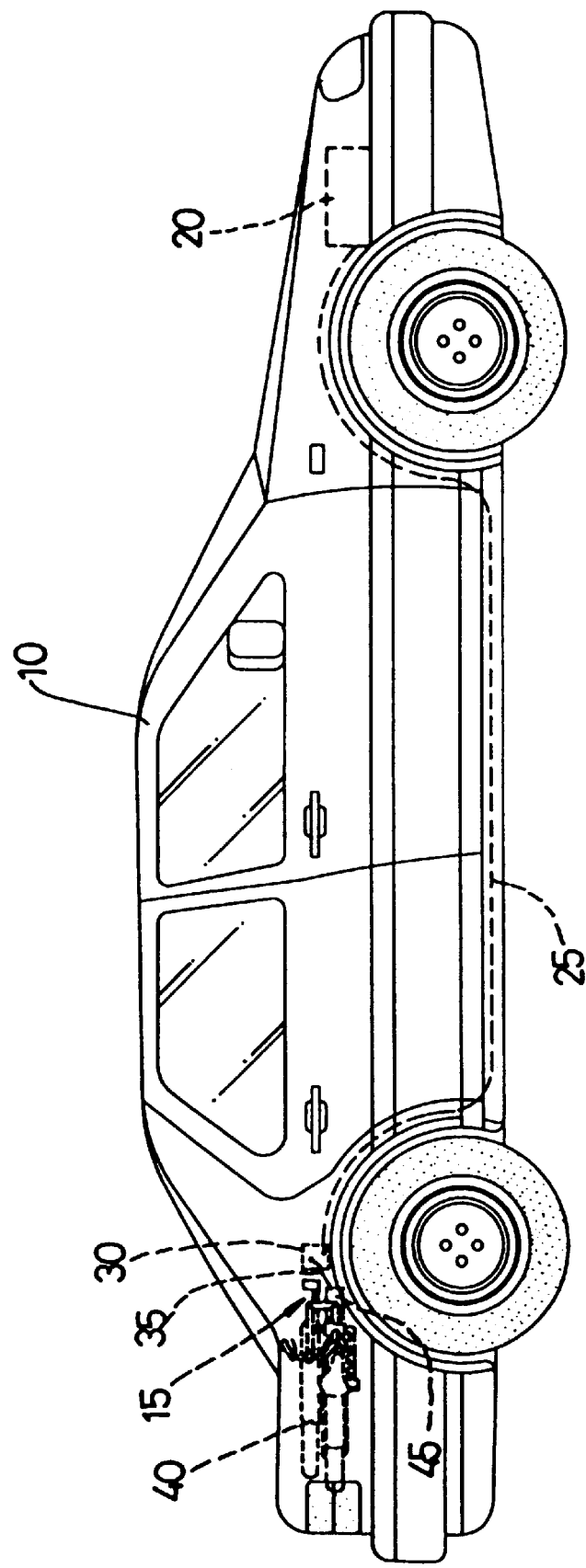
FIG. 1 is a side elevational view showing an electric bicycle folded and received in the trunk of the vehicle, and a charging device in accordance with the present invention connected to the rechargeable battery of the electric bicycle.

Referring to FIG. 1, the charging device in accordance with the present invention comprises a charger 30 which is received in the trunk 15 of the vehicle 10 and electrically connected to the battery 20 of the vehicle 10 by a conductive wire 25. The conductive wire 25 has a first end thereof connected to said charger 30 and a second end thereof connected to the battery 20 of the vehicle 10. The conductive wire 25 passes through the chassis of the vehicle 10 between the charger 30 and the battery 20. At least one wire 35 extends from the charger 30 to be electrically and detachably connected to the rechargeable battery 45 of an electric bicycle 40. The electric bicycle 40 shown in FIG. 1 can be folded to a compact size to be received in the trunk 15 of the vehicle 10.

Therefore, when the engine of the vehicle 10 is operated, the rechargeable battery 45 is being fully charged during the movement of the vehicle 10.

Figure 2:
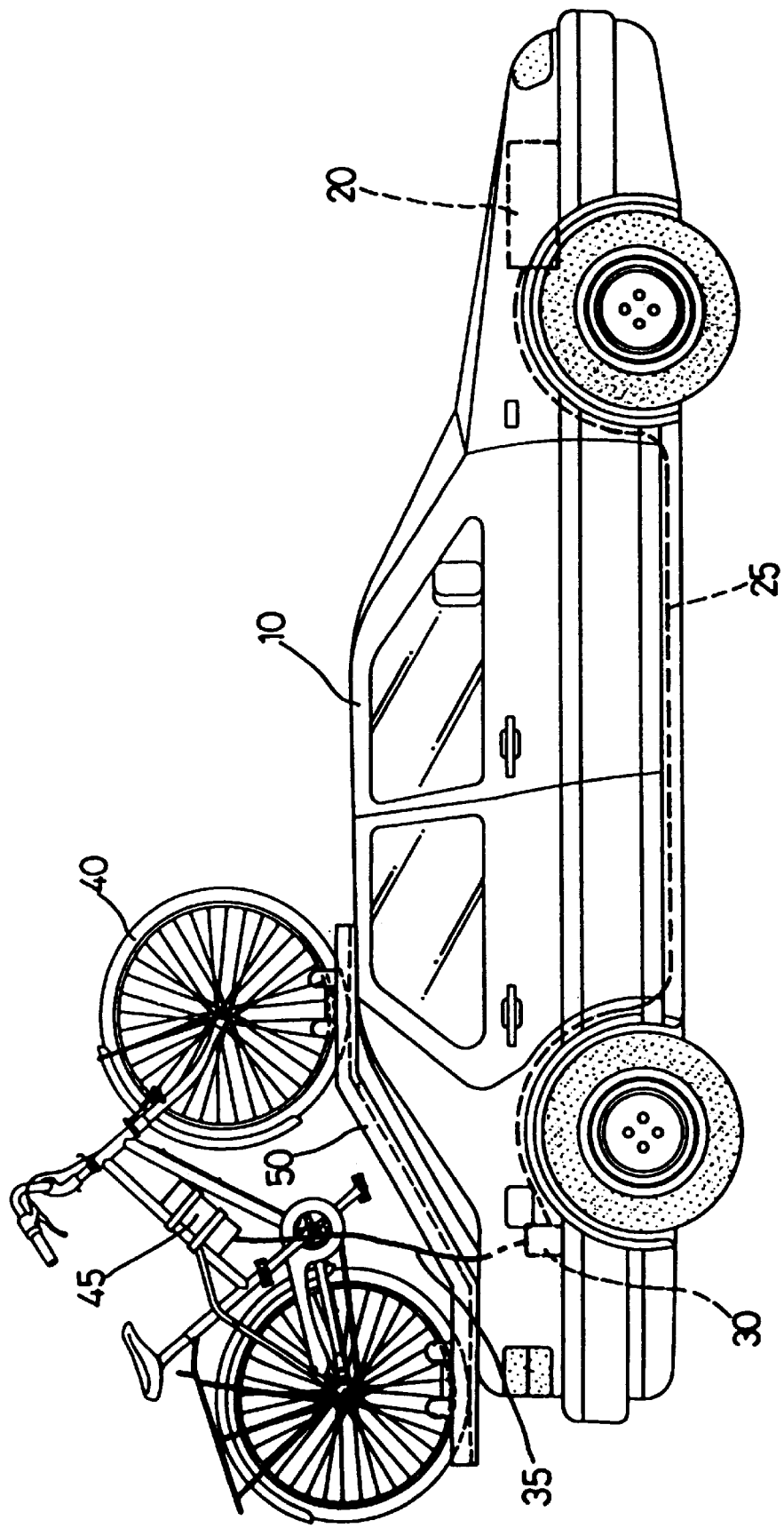
FIG. 2 is a side elevational view showing an electric bicycle carried on the vehicle, and the charging device in accordance with the present invention connected to the rechargeable battery of the electric bicycle.

FIG. 2 shows another embodiment of the charging device of the present invention for charging the rechargeable battery 45 of the electric bicycle 40, in accordance with which the electric bicycle 40 is secured and supported on a bicycle carrier 50 on the vehicle 10 and the wire 35 is connected between the rechargeable battery 45 of the electric bicycle 40 and the charger 30.

Figure 3:
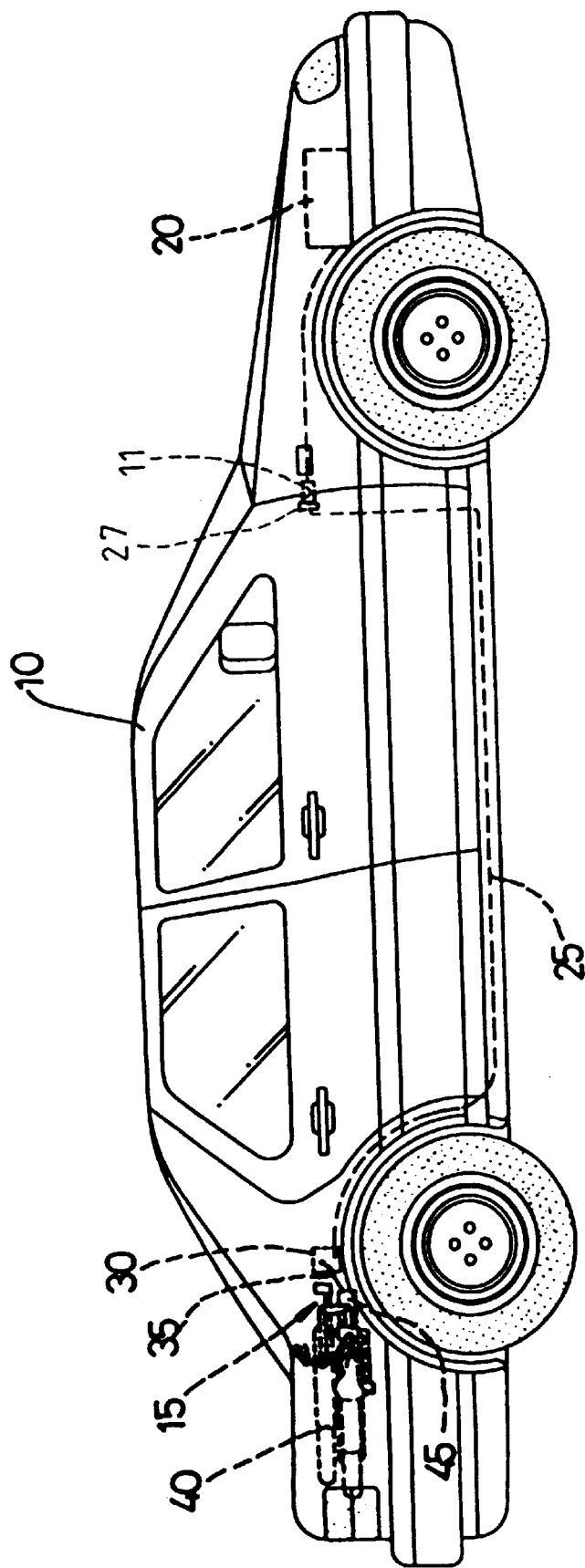
FIG. 3 is a side elevational view showing the charging device in accordance with the present invention connected to the rechargeable battery of the electric bicycle by an auxiliary wire and a conductive wire connected between the cigarette lighter receptacle hole in the vehicle and the charger.

FIG. 3 shows yet another embodiment of the connection between the battery 20 of the vehicle 10 and the charger 30. A conductive wire 25 extends from the charger 30 and has an adapter 27 connected to the free end thereof. The adapter 27 is used to be plugged in the cigarette lighter receptacle hole 11 in the dashboard of the vehicle 10 so that the user may conveniently operate the adapter 27.

The charging device of the present invention obviates inconvenient drawbacks found in the prior art of charging electric bicycles.

While various embodiments in accordance with the present invention have been shown and described, it should be clear to those skilled in the art that further embodiments may be made without departing from the scope and spirit of the present invention.

What is claimed is:

1. A charging device for charging an electric bicycle, comprising:

a motor vehicle having a battery located adjacent a front end thereof and a trunk adjacent a rear end of the motor vehicle, the electric bicycle being secured in close proximity to said trunk;

a charger positioned within said trunk of said vehicle and adapted to be electrically connected to said battery of said vehicle for charging a rechargeable battery carried by the electric bicycle during operation of said vehicle, a conductive wire extending through a chassis portion of said vehicle and electrically coupling said battery of said vehicle and said charger, and at least one auxiliary wire extending from said charger, said at least one auxiliary wire being adapted to be electrically and detachably connected to the rechargeable battery of the electric bicycle.

2. The device as claimed in claim 1, wherein said conductive wire has a first end thereof connected to said charger and a second end thereof adapted to be connected to said battery of said vehicle.

3. A charging device for charging an electric bicycle, comprising:

a motor vehicle having a battery located adjacent a front end thereof, a cigarette lighter receptacle electrically coupled to said battery, and a trunk adjacent a rear end of the motor vehicle, the electric bicycle being secured in close proximity to said trunk;

a charger positioned within said trunk of said vehicle and having at least one auxiliary wire extending therefrom, said at least one auxiliary wire being adapted for electrical and detachable connection to a rechargeable battery carried by the electric bicycle, and a conductive wire passing through a chassis portion of the vehicle, said conductive wire having a first end thereof connected to said charger and a second end thereof adapted to be connected to said cigarette lighter receptacle for charging the rechargeable battery during operation of the vehicle.

4. The device as claimed in claim 3, further comprising an adapter connected to said second end of said conductive wire, said adapter being received in said cigarette lighter receptacle of said vehicle.

* * * * *